Sept. 20, 1932.    N. E. RAMBUSH    1,878,888
APPARATUS FOR THE AUTOMATIC OPERATION OF MACHINES
Filed July 20, 1927    6 Sheets-Sheet 1

Sept. 20, 1932.  N. E. RAMBUSH  1,878,888
APPARATUS FOR THE AUTOMATIC OPERATION OF MACHINES
Filed July 20, 1927   6 Sheets-Sheet 4

Inventor
Niels Edward Rambush
By Sturtevant Mason
attys.

Sept. 20, 1932.   N. E. RAMBUSH   1,878,888
APPARATUS FOR THE AUTOMATIC OPERATION OF MACHINES
Filed July 20, 1927   6 Sheets-Sheet 6

Patented Sept. 20, 1932

1,878,888

UNITED STATES PATENT OFFICE

NIELS EDWARD RAMBUSH, OF STOCKTON-ON-TEES, ENGLAND, ASSIGNOR TO THE POWER GAS CORPORATION LIMITED, OF STOCKTON-ON-TEES, ENGLAND, A BRITISH COMPANY

APPARATUS FOR THE AUTOMATIC OPERATION OF MACHINES

Application filed July 20, 1927, Serial No. 207,303, and in Great Britain September 27, 1926.

The present invention relates to an improved apparatus for the automatic operation and control according to a predetermined sequence, of the various elements or units of a plant or machine whether these are grouped adjacent one another, or remotely situated from one another, or in certain cases, from the control gear.

The improvements of the present invention will be described by way of example as applied to the automatic operation of the valves of a water gas plant. Generally an apparatus is known for the automatic control of such plant, whereby the individual valves are caused to operate in proper sequence and in which the plant is shut down or brought into a safe position in the event of the failure of any valve to function in the predetermined manner. Further such plant has been provided with means whereby on the failure of the automatic gear, or on the failure of an individual valve or unit to operate, this unit or other units or valves as the case may be, may be operated directly or indirectly by hand. A complete summary of the history and development of such automatic control means to water gas manufacturing plant is set forth in an article by C. H. Stevick in the "American Gas Association" Monthly of February 1923.

According to the present invention a pegged drum, pegged disc or the like control element operates directly or indirectly the control elements of a servo-motor, the mechanical connection between which parts is automatically interrupted on the irregularity of displacement of any main element operated by said servo-motor.

It will be generally usual, and particularly desirable in the case where the units of the plant to be controlled are remotely situated from the control gear, or from one another, to arrange for the servo-motor to be in the form of hydraulic gear operated by pilot valves. The invention however, will be also applicable to such arrangements where the units of a plant or machine are grouped adjacent to one another and adjacent to the control gear, in which case the servo-motor may for instance, be of another type, such for instance, as a mechanical servo-motor mentioned by way of example, where a continuously rotating main power shaft can be periodically clutched to individually driven shafts by friction clutches.

Whilst according to the present invention the control for the servo-motor is a positive one it is preferred to provide also an electrical master control for this, which is preferably in the form of pairs of limit switches operated at the ends of a traverse of each unit or element of the plant or machine, and including in a parallel circuit a time lag switch whereby automatic disconnection of the mechanical drive is effected on the operation of the time switch in the event that one limit switch is not operated by the element to which it is connected within a predetermined time interval subsequent upon the operation of the other limit switch of the pair.

The invention is more particularly described with reference to the accompanying drawings in which:—

In the arrangement shown by way of example, the servo-motor includes six pilot valves 1, 2, 3, 4, 5, 6 connected by hydraulic piping with the main valves of a water gas plant, which may be remotely situated therefrom, and which in the present instance may be firstly, the steam valve, secondly, the change-over valve, thirdly the primary air valve, fourthly, the stack valve, fifthly, the tertiary air valve, and sixthly, the secondary air valve. It will be obvious however, that more or less valves can be controlled in similar manner as hereinafter described.

Figure 1:
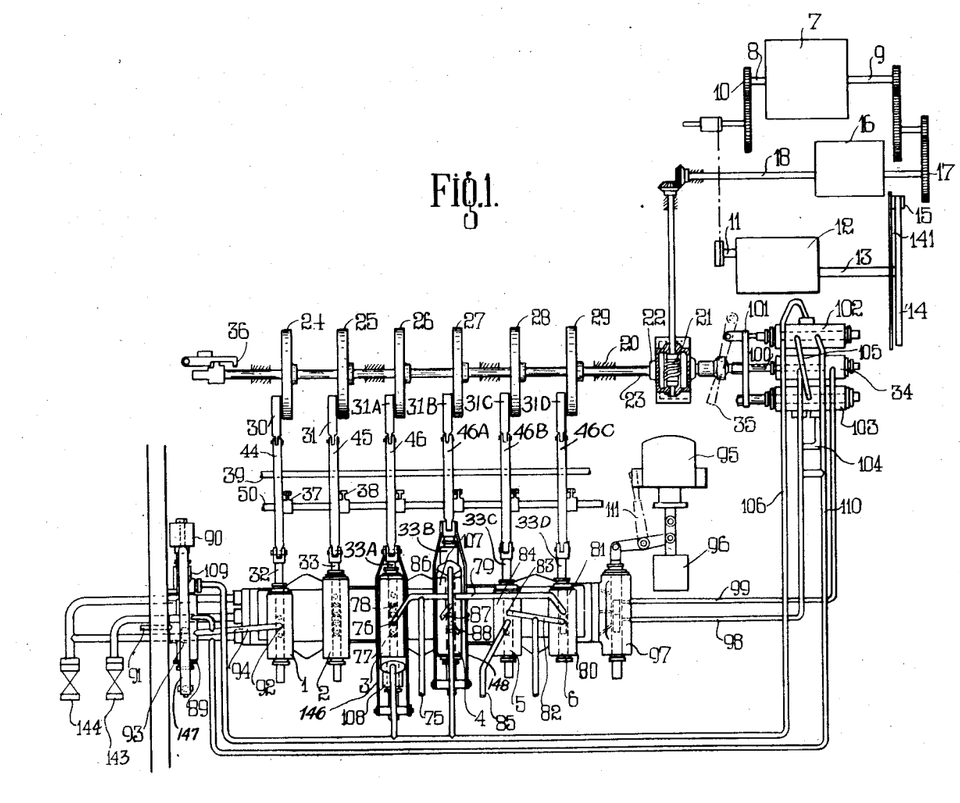
Figure 1 is a diagrammatic view showing the pilot valves of a hydraulic servo-motor gear and its mechanical drive.
Figure 2:
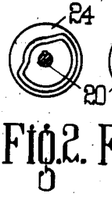
Figures 2, 3, 4, 5, 6 and 7 show shrouded cam control means for operation of the pilot valves of the gear of Figure 1 in their predetermined phase relationship.
Figure 3:
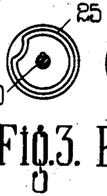
Figures 4, 5:
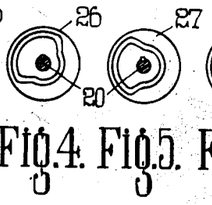
Figures 6, 7:
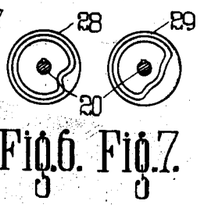

An electric motor or the like main driving element 7 drives a pair of shafts 8, 9 continuously. The shaft 8 drives through gearing 10 the shaft 11 of a variable speed transmission gear box 12. This gear box is provided with the usual control lever so that the ratio of drive between the shaft 11 and the shaft 13 can be varied as desired.

The shaft 13 carries a timing disc 14 upon it provided with a number of pegs 15 or the like adjustably mounted around its periphery, which pegs are adapted to periodically operate the release of a clutch within the casing 16 coupling a shaft 17, which is in direct driving connection with the shaft 9 to a driven shaft 18, which drives the shaft 20 through worm or the like gearing 21, the sleeve 22 of the worm engaging the shaft 20 by means of a feather 23, so that this shaft 20 with its cams 24, 25, 26, 27, 28, 29, can be moved axially when desired.

The worm gear reduction drive 21, 22, 20 is such that if $n$ cams 24 . . . 29 are provided on the shaft 20 to operate $n$ valves, then the shaft 20 is adapted to rotate one $$\frac{1}{2n}$$

of a revolution for each rotation of the shaft 18.

The cams 24 . . . 29 are preferably in the form of shrouded cams, as shown in Figures 2 to 7, and are disposed in phase relationship as shown in these figures, so that the relative operation of the servo-motor pilot valves, and of the ultimate opening or closing of the main valves of the plant is definitely predetermined. Each cam groove of the cams 24 . . . 29 engages a pin on a link 30, 31 . . . connected to the valve rods 32, 33 . . . of the valves 1, 2, 3, 4, 5, or 6, as the case may be.

In certain cases it may be desirable or necessary to disconnect the mechanical drive consisting of the shaft 20 and cams 24 . . . 29 from the pilot valves, which is effected by sliding this shaft 20 axially in its bearings until arrested by the stop 36.

This may be done by moving the hand lever 35, or in certain eventualities, automatically by means of a hydraulic piston 100.

The arrangement shown in Figure 1 is the position for normal automatic working. When however, the shaft 20 has been displaced to disconnect the cams from the fingers on the links 30, 31 . . . the pilot valve spindles 32, 33, 33A, 33B, 33C, 33D, can be operated by hand by means of hand levers 37, 38, 38A, 38B, 38C, 38D which are rigidly connected to pinions 41, 42, 43, 43A, 43B, 43C, mounted as shown on shafts 50, 51, 51A, 51B, which pinions mesh with teeth on the rack bars 44, 45, 46, 46A, 46B, 46C connecting the links 30, 31, 31A, 31B, 31C, 31D, respectively with the spindles 32, 33, 33A, 33B, 33C, 33D, of the pilot valves.

The rack bars also mesh with pinions 47, 48, 49, 49A, 49B, 49C, on the shafts 39, 40.

Interlocking gear in the form of segmental discs 52, 53, 54, 54A, 54B, 54C, 55, 55A, 55B, 55C, is arranged between the two series of shafts so that certain pilot valve spindles cannot be operated at all by hand or automatically unless their position is a definite one with regard to the position of the spindles of certain other valves.

Figure 15:
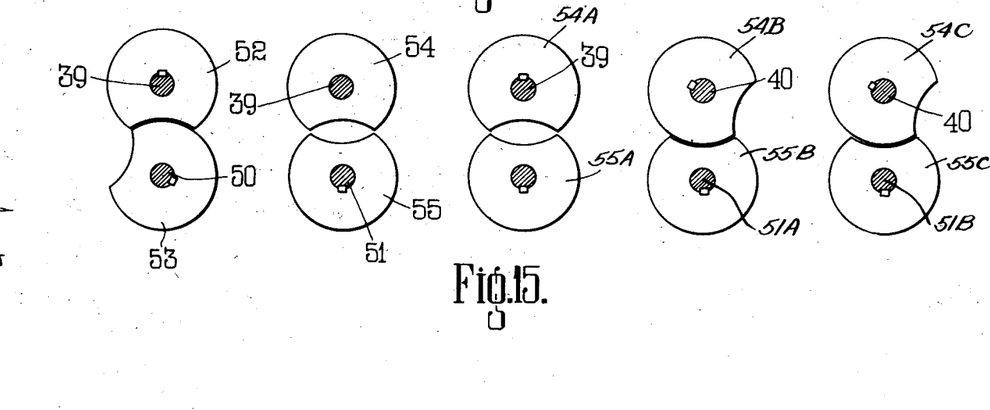
Figure 15 is a plan view showing interlocking mechanism for said valves.

Figure 15 shows the method of interlocking, all the discs being shown in the valve closed position.

It will be seen that disc 52 cannot move until 53 has moved to allow the circumference of 52 to pass through the cut away portion. Also when 53 has moved and 52 as well 53 cannot return to its former position until 52 has first returned to its.

In other words the change-over pilot valve (corresponding to disc 52) must open after, and close before the steam valve (corresponding to disc 53).

The remaining diagrams show that:—

(a) The primary air and steam valves (discs 54 and 55 respectively) cannot be open together.

(b) The change over and primary air valves (discs 54A and 55A respectively) cannot open together.

(c) The tertiary air valve (disc 55B) must be open after and close before the stack valve (disc 54B).

(d) The secondary air valve (disc 55C) must open after and close before the stack valve (disc 54C).

Figure 14:
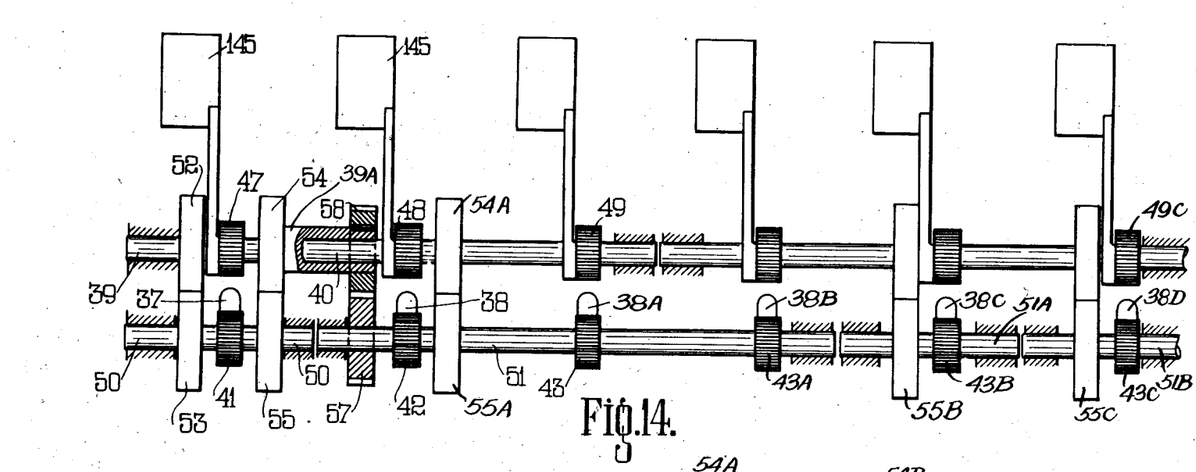
Figure 14 is a view showing a means for mechanical inter-connection of the pilot valves.

Referring to Figure 14, the steam-valve discs 53 and 55 are operated by the steam valve handle 37 and the fixed pinion 41; pinion 47 is loose.

The change over valve handle 38 works the loose pinion 42, and by means of rack bar 45, the fixed pinion 48, thus rotating discs 52, 54A.

The primary air lever 38A operates through the fixed pinion 43 rotating the shaft 51 and therefore the primary air disc 55A keyed thereto. The second primary air disc 54 is rotated by means of the pinion 57, keyed to 51, and the pinion 58 keyed to the loose sleeve 39A with which the disc 54 is integral.

The pinion 49 is loose.

The stack valve lever 38B works the stack valve discs 54B and 54C keyed to shaft 40, by means of loose pinion 43A, rack bar 46A, and fixed pinion 49A.

The tertiary air disc 55B and the secondary air disc 55C are worked directly through pinions 43B and 43C, keyed to shafts 51A and 51B and fastened to the tertiary air handle 38C and the secondary air handle 38D respectively.

The pinions 49B and 49C are loose.

Counter-weights 145 are preferably provided rigid with the gear wheels 47, 48, 49, 49A, 49B, 49C to balance the weight of rack bars, 44, 45, 46, 46A, 46B, 46C, respectively and that of the pilot valve spindles.

Under normal operation of the plant, the servo-motor pilot valve spindles 32, 33, 33A . . . will be operated automatically by the rotation of the shaft 20, and in the present instance one-twelfth of a revolution at a time. The interval between the turning of this shaft 20 one-twelfth of a revolution for the operation of any valve and the commencement of its next rotation for the operation of another valve will differ according to circumstances, and can be determined by the various positioning of the pegs 15 round the periphery of the disc 14.

Figure 8:
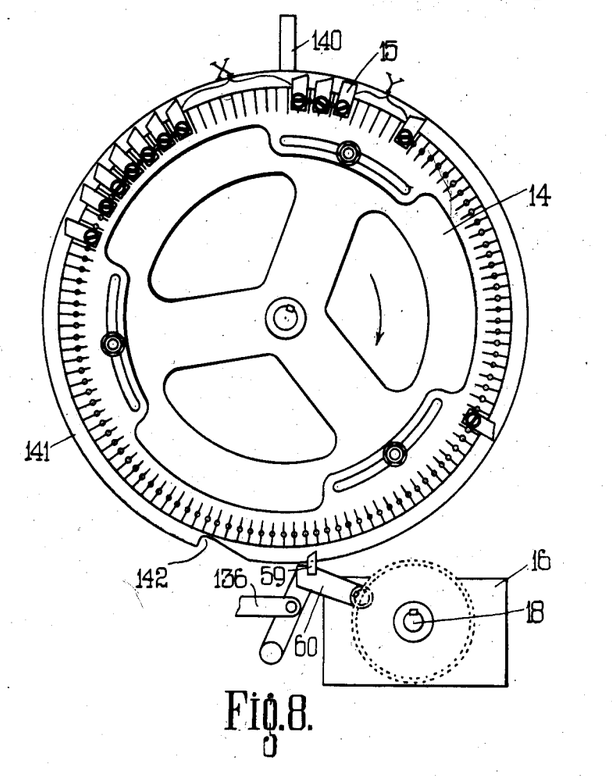
Figure 8 shows one form of a controlling pegged disc.

Now it has been found in practice that certain main valves of the plant require a much longer time for their operation than others, and to avoid any possibility of danger of one valve being operated before another certain valve has completed its movement, this timing disc 14 can be provided with blank spaces, such as shown at X, Y, in Figure 8 in which no peg can be positioned.

Again on the other hand it may be found desirable to operate the valves immediately consequent upon one another to reduce the time interval between the finishing of one-twelfth rotation of the shaft 20 and the commencement of its next one-twelfth revolution. For this purpose special pegs 15 can be provided having a broader surface than that shown to overlap the normal angular position occupied by one of these pegs on the disc, that is to say, that the peg 15 may be in certain cases, so wide that it will cause the clutch 16 to remain engaged for more than one unit one-twelfth revolution, for instance, two unit one-twelfths, or one-sixth of a revolution or more in the present instance, taken by way of example.

As this peg timing disc 14 rotates, the pegs 15 engage in turn a stop 59 on a trigger device 60, which automatically operates the engagement of the clutch within the casing 16 for a single revolution of the shaft 18 only. The trigger device 60 is keyed to a shaft 61 which has an arm 62 loose upon it, and an arm 63 keyed to it. The arm 63 has a pin 64, which when the shaft 61 is oscillated engages under the arm 62 to lift a catch 65 on this out of range of a stop 66 on the snail cam 67 integral with the sleeve 68. The rise of the arm 63 removes a pin 73 thereon from the face of a cam 72 on the sleeve, whereupon a spring 69 arranged between the casing 16 and sleeve 68 forces the clutch parts 67 and 70 into engagement. The catch 59 will normally be immediately released by the peg 15 to allow the arm 63 to fall back into its normal position under spring action 71. The shaft 17 will then continue to drive the shaft 18 until the cam face 72 on the sleeve 68 commences to abut against the pin 73 on the arm 63, which forces it sideways against the spring 69 and so brings the clutch parts 70 out of engagement. The stop 65 under the action of the spring 74 will then be in a position to stop the clutch sleeve 67 in the original starting position.

Figure 9:
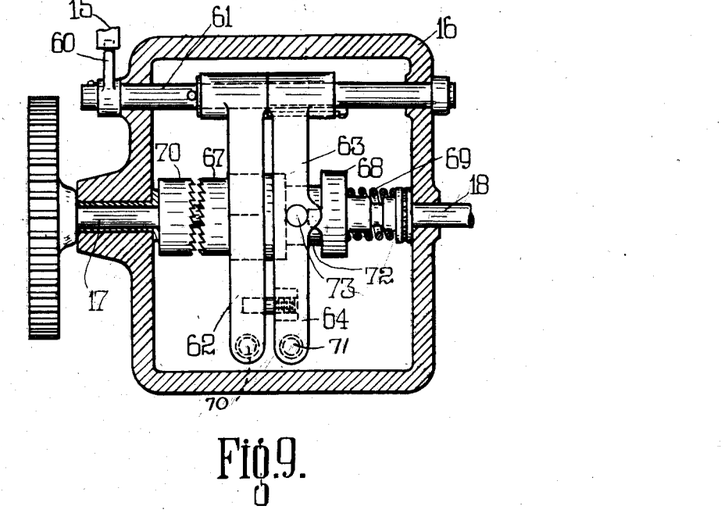
Figure 9 is a detail sectional end view, through a mechanism for assuring that the driven shaft shall rotate one revolution only at a time.
Figure 10:
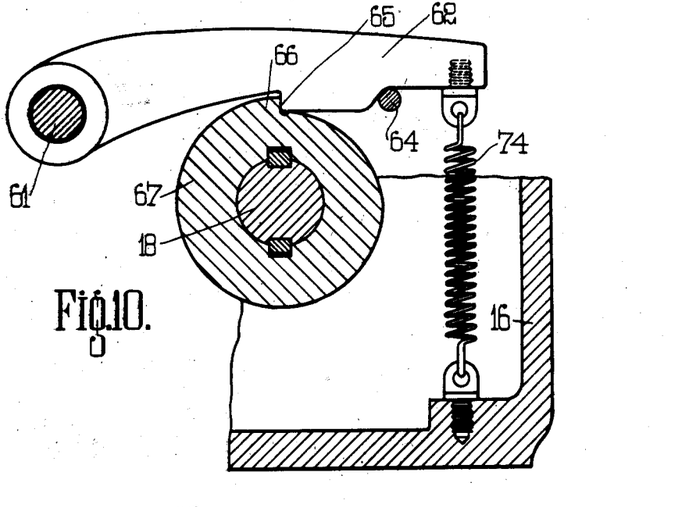
Figure 10 is a detail view of the arresting gear of Figure 9.
Figure 11:
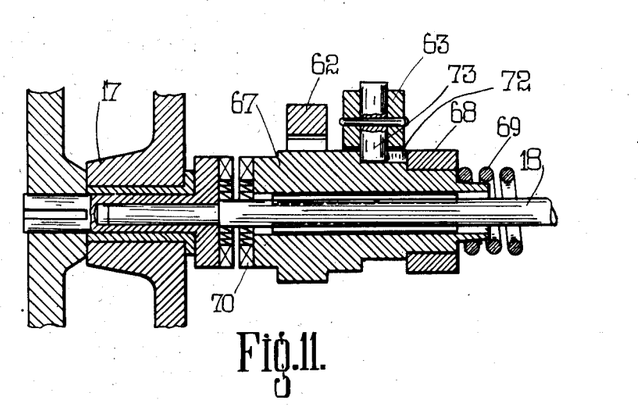
Figures 11 and 12 are further details of this mechanism in sectional elevation.
Figure 12:
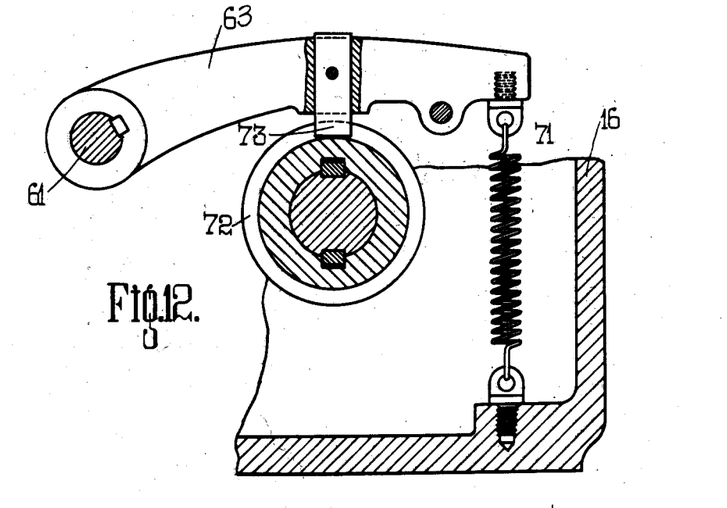

It may in certain cases be desirable to provide additional means for ensuring that the shaft 18 completes exactly one revolution. Such means may for instance, take the form of a spring controlled cam carried by the shaft 18, so that during the first half revolution of this shaft, the spring is stretched against the rotation of the shaft, whilst during the second half revolution the spring tends to rotate the shaft until such time as the catch 65 engages behind the step 66 on the snail cam portion of the sleeve 67.

It will consequently be seen that as the peg disc 14 is constantly rotated the shaft 20 will be rotated step by step to automatically operate the pilot valves controlling the displacement by hydraulic means of the various main valves of the water gas plant.

In certain cases it may be desirable to interconnect some of these valves, and also to provide emergency cylinders for use in certain eventualities. For instance, the primary, secondary and tertiary air pilot valves may be interconnected hydraulically, so that they can only be effective in the proper order. When the primary air pilot valve operated by the spindle 33A is shut the pipe line connection 75 to the main hydraulic cylinder operating the main primary air valve of the plant is in communication with the exhaust via ports 76, 77. If the piston of the pilot valve is then moved to its upper position the cavity in this covering the ports 76, 77 will now cover the ports 76, 78. The pipe line 75 is therefore, placed in communication with the high pressure oil supply, and the main cylinder of the main primary air valve of the plant will be fed with pressure oil. When the pilot valve operated by the spindle 33A is opened the pipe line 79 feeds high pressure oil to the port 80 on the secondary air pilot valve 6. If now the valve 6 be placed into the open position, the pipe line connection 82 from this will be connected to pressure instead of to exhaust. It will be seen that this can only happen if the valve 3 is open, as otherwise the port 80 will not be fed with high pressure oil. When valves 3, 6 are open connection 82 feed high pressure oil to the port 83 on the tertiary air pilot valve 5, consequently on opening the tertiary air pilot valve 5 the pipe line 85 on this is connected to pressure instead of to exhaust, and it will consequently be seen that by this means the three main valves corresponding to these pilot valves taken by way of example, are hydraulically interconnected, so that they can only open in the proper order.

In the case of the stack pilot valve 4, the ports 87, 88 on this and their respective connections are alternately connected to pressure or to exhaust according to the position of the pilot piston, and the hydraulic cylinder operating the main stack valve will be directly operated from these connections. The change-over pilot valve 2 may operate in a similar manner to the stack pilot valve.

The primary air, stack and change over pilot valves are double acting, that is to say, they have two connections to the corresponding main valves, which are operated by double acting hydraulic cylinder, while the main steam and secondary and tertiary air valves are single acting, but either or both sets of valves can be either single or double acting.

In the case of the steam pilot valve 1, this operates normally via the additional steam pilot valve 89 normally kept open by means of a weight 90. The connection 91 to the main cylinder on the steam valve thus communicates with the port 92 on the pilot valve 1 through the cavity 93 and pipe 94.

It will hereinafter be shown that operation of an electric circuit due to failure of correct operation of a valve will cause the circuit through a solenoid 95 to be broken and allow the weight 96 to drop, operating the reversing emergency valve 97, which changes the pipe lines 98, 99 from exhaust to pressure, and from pressure to exhaust respectively. Pressure oil will then be fed to the left-hand end of the cylinder 34, the piston 100 of which will then be displaced to the right, taking with it the shaft 20 until arrested by the stop 36, thus operating the automatic disconnection of the mechanical drive to the pilot valves. This displacement of the piston 100 also moves a yoke 101 sliding freely on the piston rod of a valve 102, but displacing directly the piston of a valve 103, which as this is displaced connects the branch pipe 104 connected to pipe 98 with a cavity in the piston, and thence through connection 105 with a similar cavity in piston of the valve 102, whereby high pressure oil is fed to the pipe line 106 feeding the three emergency cylinders, viz the stack emergency cylinder 107, the primary air emergency cylinder 108, and the steam emergency cylinder 109. The pipe lines 104, 98, are normally, in the machine operated position, connected to exhaust. When the weight 96 falls however, and so lifts the main emergency valve 97, they are connected to pressure. As, simultaneously the pistons in cylinders 34 and 103 are moved to the right, connection is made to permit of high pressure oil flowing from pipe 104 to pipe 106 and so operating the emergency cylinders.

The emergency cylinders 108, 109 are adapted to shut down the primary air pilot valve 3, and the additional steam valve 89 by means of links 146, 147 respectively, and the emergency cylinder 107 is adapted to open the stack pilot valve 4 by means of link 148. Thus if shut the main stack valve will be caused to open, and if they are open, the main primary air and steam valves will be caused to shut, so that the plant will be immediately shut down to a safe position. The main hydraulic pressure connection is shown at 143, the main exhaust connection at 144.

If it is then desired to operate any of the valves by means of the hand control previously described, the hand lever 35 will be displaced to pull the piston valve 102 towards the right, so that pipe 106 will then be connected to exhaust, as also the emergency cylinders 107, 108, 109. A hand lever 111 can be provided for resetting the emergency valve 97, whereby through the piston in cylinder 34 the cylinders 102, 103 will be re-set automatically.

Means are, according to the present invention, provided whereby the automatic operation of the pilot valves of the servo-motor is put out of action and the plant brought to a safe position whenever any main valve of a plant fails to operate in a predetermined manner; that is to say, either fails to open or to shut when so required, or fails to complete its normal traverse between the open and shut positions, or vice versa, within a predetermined maximum time. For this purpose in one arrangement according to the present invention shown by way of example in Figure 13, three-phase alternating current means 112 supply current to the motor 7 preferably provided with an electric brake 114, which brake is effective when there is no current in the system. One pole of the three-phase supply 112 is in circuit with a contactor 115 for starting and stopping the motor 7 the operating solenoid for this contactor being in circuit with a switch 116 automatically operated from a solenoid 117. The leads 118, 119 are arranged in circuit with a switch 120 connected to the direct current supply, the lead 118 passing from the switch 120 to a switch 121, which may be opened for stopping the motor. The other lead 119 proceeds from switch 120 via a plurality of reversing switches 122, 123, 124 . . . which are mounted one on each pilot valve, and in number equivalent to the number of the pilot valves of the plant (six in the present instance) and via pairs of limit switches 125, 126, 127, 128 . . . one pair of limit switches also being provided for each main valve, thence through an over-load relay 129 to a no voltage relay 130, solenoid 117 to switch 121. Should therefore, this particular circuit be interrupted at any point except switch 121, a solenoid 131 fed from branch leads 132, 133 will be de-energized, and the switch 134 will be caused to open the circuit of the solenoid 95, thus operating the reversing emergency valve 97 as above described.

Figure 13:
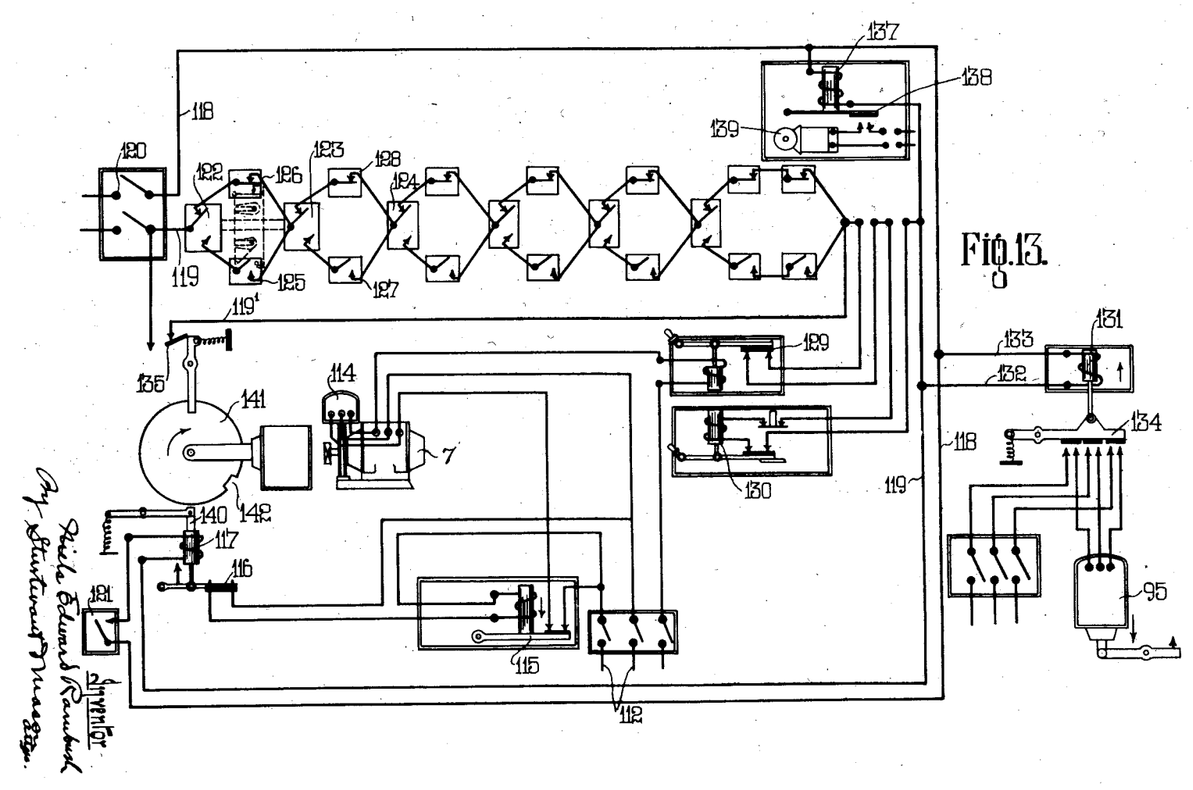
Figure 13 is a wiring diagram showing the interdisposition of the time limit switches.

The limit switches 125, 126, 127, 128 . . . are mounted on the main operating valves of the plant, and provided these main valves complete their proper travel within a predetermined time one or other of these limit switches will be closed when the valve is stationary. The circuit through these limit switches is completed through the reversing switches 122, 123 . . . so that when the upper limit switch 126 is closed the reversing switch 122 will be in the top position, whilst when 126 is broken and 125 is closed the switch 122 will be in the bottom position. Now as the main valve of the plant is operated and commences to move the switch 126 will be broken, but the switch 125 will not be closed until the valve has completed its travel. The circuit will however, be maintained for a predetermined time period through a lead 119' and time lag switch 135, which is operated by the pegs 15 of the timing disc 14 in sequence.

At substantially the time at which any peg or finger 15 on the timing disc 14 initiates the series of movement leading to the operation of any pilot valve, it will consequently also close the switch 135 through the lever connection 136 (Figure 8) and will enable current to be maintained for a certain time, for instance, five seconds. If at the end of this five seconds period the opposite main limit switch is not in its proper position showing that the valve has completed its proper movement, the main current circuit is broken, and the plant will be shut down, whereby also the solenoid 137 across the circuit 118, 119 will be de-energized, and the switch 138 closed to ring a bell 139, and give warning to the operator.

If desired the limit switches 125, 126, 127, 128, may also operate indicator lamps to tell an operator on the plant the position of any valve, and the particular valve which has failed to operate, and which has been the cause of the plant shutting down.

When the plant has been shut down through a faulty valve operation in this manner, and the solenoid 117 has become de-energized, a pin 140 riding on the circumference or a disc 141 will fall into a slot 142 on this disc when the said slot comes opposite to it. The disc 141 is keyed upon, but angularly adjustable relatively to the timing disc 14. As soon as the pin 140 moves into the slot 142, the switch 116 will be operated to stop the main driving motor in a position in which the timing dial 14 lies at the zero position of the cycle; that is to say, a position corresponding to one in which the steam and primary valves are shut with the stack valve open.

Other mechanisms may be employed in the place of the pegged disc or drum such mechanism including a chain on sprockets fitted with the required stops, or other rotary element.

I declare that what I claim is:—

1. In a safety system for the automatic operation of the separate units of a plant, having a servo-motor for each unit and an actuating means therefor, an electric supervisory circuit and a timing mechanism, the combination of means tending normally to move said servo-motors to a safe position, an electro-magnetically operated device in said circuit, serving while energized to prevent the operation of said moving means, selecting switches in said circuit operated by said servo-motors, limit switches in said circuit closable by said units at the end of their travel, and a time switch closed at intervals by said timing mechanism and adapted to remain closed during a period of time slightly exceeding the normal period of travel of the said units, said time switch being arranged in shunt with said limit and said selective switches, whereby the said electro-magnetically operated device remains energized as long as the units are in their selected end positions and for said period of time after a servo-motor initiates the actuation of its corresponding unit towards another end position.

2. In a safety system for the automatic operation of the separate units of a plant, having a servo-motor for each unit and an actuating means therefor, a timing mechanism and an electric supervisory circuit, the combination of means tending normally to move said servo-motors to a safe position, an electro-magnetically operated device in said circuit serving while energized to prevent the operation of said moving means, a plurality of two-way switches with a common and two selective terminals in said circuit one of said two-way switches being connected for operation by each servo-motor, a pair of limit switches connected to each unit to be closed by the unit at the end of its movement in one or other direction, conductors for connecting the limit switches of each unit with the selective terminals of the two-way switch of the corresponding servo-motor, conductors for connecting the limit switches of one unit to the common terminal of another selective switch whereby to provide branches in which the limit switches of each pair are connected in shunt to one another, and a time switch closed at intervals by said timing mechanism, and adapted to remain closed during a period of time slightly exceeding the normal period of travel of said units, said time switch being arranged in shunt with said limit and two-way switches whereby the energization of said electromagnetically operated device is maintained during the normal period of travel of said units, but interrupted to deenergize the electromagnetic device upon interruption of the normal travel of said units whereby the servo-motors are moved to a safe position.

In witness whereof, I have hereunto signed my name this 30th day of June, 1927.

NIELS EDWARD RAMBUSH.